United States Patent [19]

Cohen

[11] 4,062,294
[45] Dec. 13, 1977

[54] MODEL RAILWAY POWER SUPPLY

[75] Inventor: Mordecai Elias Cohen, Barnet, England

[73] Assignee: Rosefair Electronics Limited, Watford, England

[21] Appl. No.: 667,909

[22] Filed: Mar. 17, 1976

[30] Foreign Application Priority Data

Mar. 20, 1975 United Kingdom ............... 11739/75
Oct. 17, 1975 United Kingdom ............... 42758/75

[51] Int. Cl.$^2$ ............................................. B60M 1/00
[52] U.S. Cl. ........................................ 104/149; 191/5; 246/34 R; 307/2; 324/51
[58] Field of Search ................... 104/147 A, 149, 159; 307/2, 43; 246/34 R, 34 CT; 317/10; 324/37, 51; 361/50, 128; 191/3, 5

[56] References Cited

U.S. PATENT DOCUMENTS

| | | | |
|---|---|---|---|
| 2,150,774 | 3/1939 | Ledwinka | 246/34 R |
| 2,211,181 | 8/1940 | Thompson | 246/34 R |
| 2,528,558 | 11/1950 | Sherman | 324/51 |
| 2,853,957 | 9/1958 | Dean | 246/34 R |
| 2,965,044 | 12/1960 | Johnson | 104/149 |
| 2,985,752 | 5/1961 | Fines | 246/34 R |
| 3,214,597 | 10/1965 | Jordan | 307/2 |
| 3,705,387 | 12/1972 | Stern | 104/149 |

Primary Examiner—George E. A. Halvosa
Assistant Examiner—Reinhard J. Eisenzopf
Attorney, Agent, or Firm—Lawrence E. Laubscher

[57] ABSTRACT

A model railway or road vehicle installation in which vehicle-mounted electric drive motors are supplied through contact with track conductors, including a power supply providing an intrinsically safe a.c. component of such frequency and amplitude as to be capable of breaking down any contact inhibiting dielectric layer of dust, grease, metal oxide etc. on the track conductors, in addition to the normal d.c. component powering the vehicle. An automatic arrangement suppresses the a.c. component so long as good electrical contact is maintained so that the a.c. component is provided only when necessary. For facilitating slow speed operation, the d.c. supply is pulsed with a variable mark to space ratio dependent upon the desired vehicle speed thereby to maintain the torque output of the vehicle motor.

13 Claims, 3 Drawing Figures

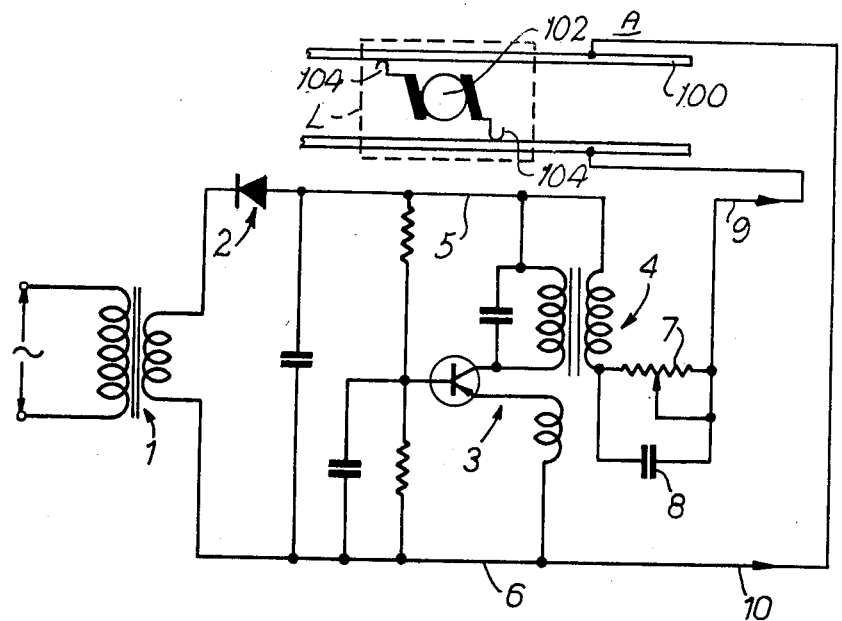
FIG. 1.
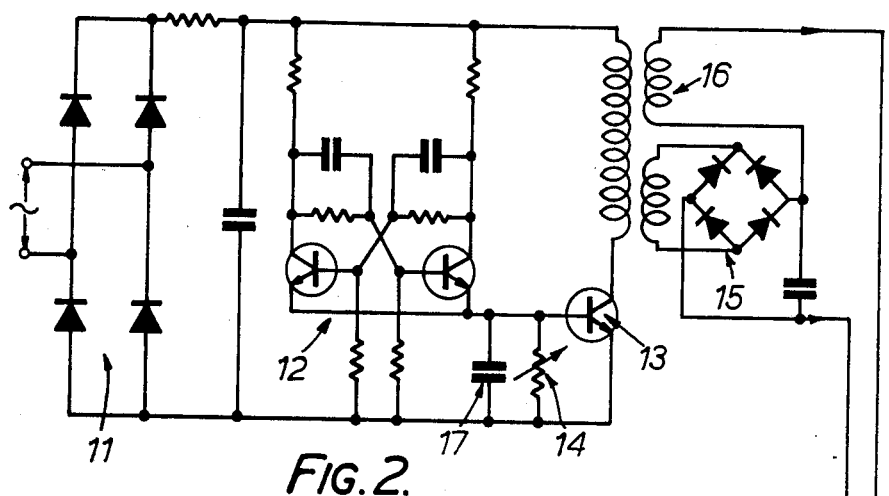
FIG. 2.
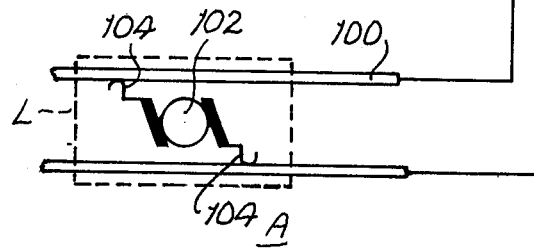

MODEL RAILWAY POWER SUPPLY

FIELD OF THE INVENTION

This invention generally concerns improvements in or relating to the making of electrical connections between relatively movable members, and has particular, though not exclusive, application to situations where the continuity of a supply of electrical energy to a load is dependent upon the maintenance of good electrical contact between a moving contactor and a power supply bus as, for example, in model railway railroad or roadway installations where the power supply to a model vehicle is obtained by means of contactors on the vehicle which may be constituted by the vehicle wheels adapted to make electrical contact with supply rails or tracks. In the following description, the invention will be described and explained with particular reference to a model railway installations, but it is to be appreciated that the invention is not limited to such an application but that the model railway application of the invention is merely exemplary of the broader applications of the invention for example to other model vehicle installations.

BACKGROUND OF THE INVENTION

Model railway installations generally are arranged to operate e.g. from a nominally 15 volt direct current supply generally derived from the mains alternating current supply by transformation and rectification. The model locomotives incorporate miniature d.c. motors arranged to be powered from the track, which is connected to the 15 volt supply, through one or more sliding contactors carried by the locomotive and/or through the contact of the locomotive wheels with the track. Any dust, grease, metal oxide and the like on the track can interrupt the continuous supply of driving power to the locomotive causing it to stop or at least to falter in its progress. Once the locomotive has stopped owing to disruption of its electrical connection with the track, it generally cannot be restarted merely by operation of the speed/go/stop controller of the installation and needs to be moved manually to another, clean part of the track.

BRIEF SUMMARY OF THE INVENTION

It is an object of the invention to provide a power supply which overcomes or at least substantially reduces the effects of grease or like contaminant on a supply rail for a vehicle installation in which a vehicle driven by an electric motor is supplied with an electric current through a contactor on the vehicle in contact with the rail.

The present invention provides a power supply in which a selectively variable current is supplied to the rail to operate the motor and thereby drive the vehicle at a controllable speed, and which also includes an oscillator to generate an alternating signal which is applied to the supply rail, the alternating signal being of a frequency and amplitude to ionize dielectric on the track and thereby maintain continuity of supply of the variable current to the motor through the contactor.

The frequency and voltage of the alternating signal is selected to be intrinsically safe, at least for those applications where there is a risk of user contact with the supply rail, and particularly to be capable of ionizing the air gap across the dielectric constituted by the type of contact inhibiting layer (e.g. dust, grease, metal oxide etc) normally encountered in use of the installation so that, when such a dielectric is encountered and the direct current path interrupted thereby, the ionization of the air gap across the dielectric by the alternating current component will re-establish a direct current path via the ionized air gap.

Depending upon the nature of the installation and upon the nature of the dielectric layer likely to be encountered in normal use of the installation, various alternating current source frequencies and voltages might be employed in the performance of this invention. For model railway and roadway installation for example, we have found that high frequencies of the order of 100 to 200 KHz or higher and peak voltages around 300 volts are most suitable, although other frequencies as low as 500 Hz for example and other peak voltages as low as 100 volts for example can be employed.

As will be appreciated from detailed descriptions given hereinafter of exemplary embodiments of the invention, the invention can be embodied in various different forms. In one form, the invention provides an add-on unit to be used with an existing direct current source to provide the additional alternating current components, whereas in another form the invention provides a complete integrated direct current and alternating current power supply unit. The speed/go/stop control required in model railway installations, for example, can also be incorporated into the power supply unit.

The present invention has been found, in the course of trials conducted on model railway installations, to provide a complete solution to the problems hitherto encountered as the result of poor electrical contact between the locomotives and the track. Tendancy for the locomotive either to stop or to falter in its progress along the track is absolutely negated. An altogether smoother running installation is achieved since the alternating current component in the power supply to the installation is ever ready to combat substantially instantaneously any disruption of the direct current continuity between the locomotive and the track owing to intervening dielectric.

The invention can best be embodied by utilization of solid state circuitry at least for derivation of the alternating current component. In one preferred arrangement, the conventially employed step-down transformer followed by a rectifier for deriving the direct current component from mains alternating current supply is replaced by a solid state circuit comprising a diode bridge rectifier which supplies a free running multivibrator circuit the output of which is controllably gated and inductively coupled to an output circuit including one inductively coupled section incorporating a diode recrifier for deriving a direct current component and a second inductively coupled section arranged for deriving the requisite alternating current component.

In another embodiment of the invention the oscillator is arranged to provide an output only when the contactor on the vehicle is in contact with a position of the supply rail that is coated in grease or like dielectric. The oscillator is normally held in a clamped condition by the impedance presented to the oscillator by the supply rail, but the increased impedance presented by the dielectric on the rail is utilized to render the oscillator unclamped so that it can deliver an alternating output to the rail.

The supply current for driving the vehicle typically comprises a full wave rectified a.c. signal derived from a domestic a.c. means supply and is arranged to be of selectively variable amplitude or d.c. level in order to control the speed of the driven vehicle. Such an arrangement is conventional but suffers from disadvantages where low speed operation is required since the correspondingly low supply current to the vehicle motor produces only minimal torque in the motor which commonly is insufficient to propel the vehicle. This problem can be alleviated by driving the vehicle with a pulsating d.c. current of full amplitude and of variable mark to space ratio dependent upon the desired vehicle speed, since the torque of the motor is thereby maintained at an optimum level, albeit intermittently, capable of reliably propelling the vehicle. As is conventional in the art, the term "mark" refers to the time period corresponding to the relation of the pulses of a square wave pulse train, and the term "space" corresponds to the time period between successive pulses.

THE PRIOR ART

Model railway installations which have a power supply arranged to provide a selectively variable d.c. current for driving a model railroad locomotive at variable speed, the power supply also being arranged to provide an alternating current output for controlling ancillary functions in the installation such as electric signals on ancillary equipment on the locomotive disclosed in British Patent Specifications Nos. 877102, 889690 and 1 177 484. British Patent 1 179 697 discloses a fairground vehicle wherein an a.c. control signal is superposed on an a.c. drive current. Other model railway systems wherein a.c. and d.c. are combined in the supply to the track are disclosed in United States Patent Specification 2,872,879 where the different components of the supply perform different functions on different vehicle models. United States Specifications No. 3,214,597 discloses a model train control wherein the power supply superposes a half-wave rectified a.c. signal on an essentially d.c. speed control signal for the purpose of enhancing the drive to the vehicle at low speeds where the motor would otherwise tend to be only weakly torqued were it powered by d.c. alone. None of these prior art disclosures contain any suggestion whatsoever that the a.c. components should be such as to be capable of breaking down a contact-inhibiting dielectric layer of dust, dirt, grease, etc on the trackway conductor, and indeed the a.c. components described are not so capable.

BRIEF DESCRIPTION OF THE DRAWINGS

In order that the invention can be clearly understood, some exemplary embodiments thereof will now be described with reference to the accompanying drawings wherein:

FIG. 1 shows a schematic circuit diagram of a complete power supply system, in accordance with the present invention, for a model railway installation;

FIG. 2 shows an alternative form of power supply according to this invention which employs solid state techniques throughout.

DETAILED DESCRIPTION OF PREFERRED EMBODIMENTS

Figure 3:
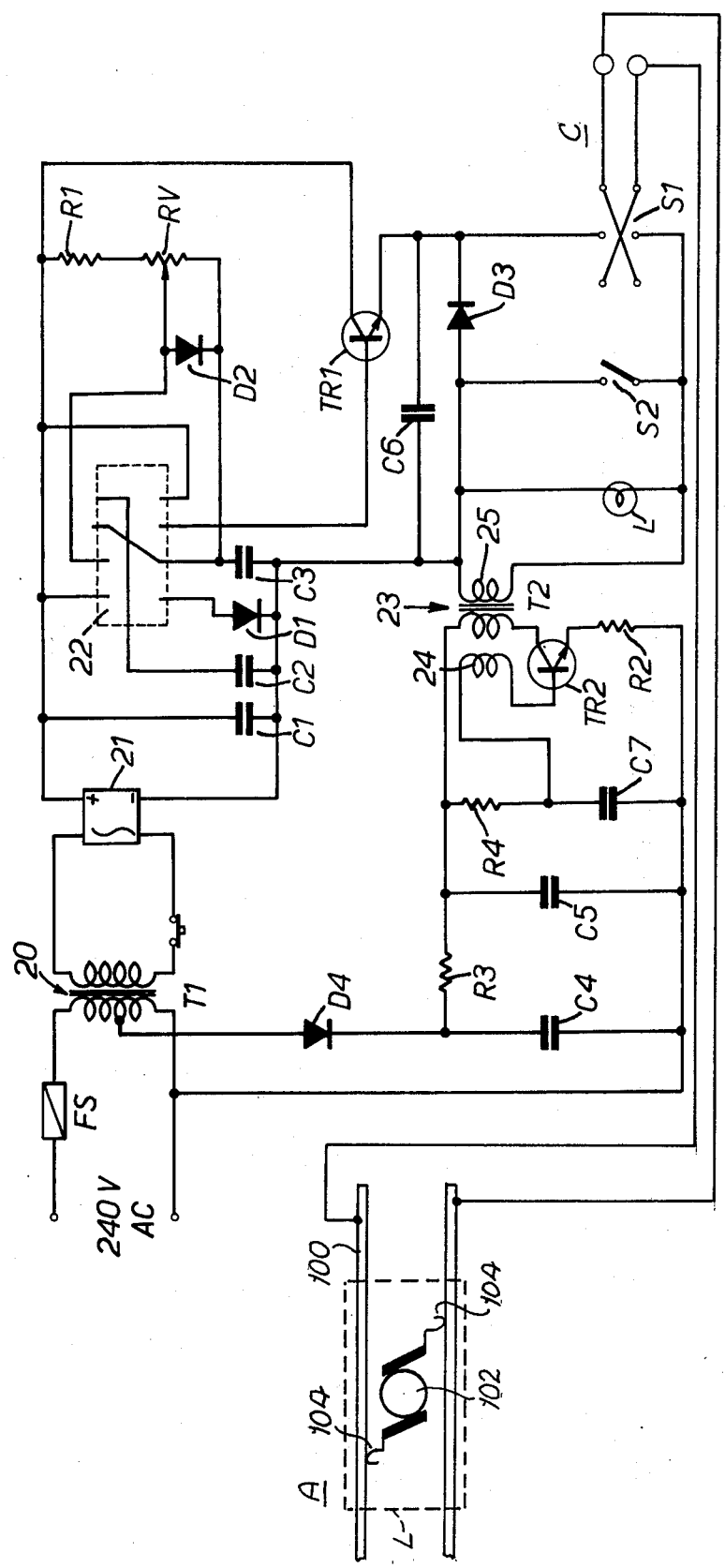
FIG. 3 illustrates a schematic circuit diagram of a more sophisticated power supply in accordance with the invention for a model railway installation.

Referring first to FIG. 1, there is shown therein an exemplary embodiment of a power supply for a model railroad or railway installation A which comprises generally an input transformer 1, a rectifier stage 2, a transistor oscillator 3, and an output stage 4 transformer coupled with the transistor oscillator 3. The transformer 1 and rectifier stage 2 are adapted to derive, from an alternating-correct voltage supply connected to the transformer primary, a nominal direct current supply on lines 5 and 6 to the following transistor oscillator 3. The transistor oscillator 3 is a substantially conventional tuned-collector transistor oscillator having its output coupled inductively to output stage transformer 4 which includes a speed/go/stop current control potentiometer 7 operative in its direct current path and bridged by a capacitor 8 in its alternating current path. The output terminals 9 and 10 of the circuit are for connection to a supply surface load which in this case comprises the railway track 100. As is known in the art, the locomotives L for use on the track each have an electric motor 102 driven by a current derived from the track by a contactor 104 in contact with the track. The contactor typically comprises the wheels of the locomotive.

In the operation of the power supply of FIG. 1, the application of the alternating-current supply voltage to the primary of input transformer 1 produces at the output terminals 9 and 10 a nominal direct current potential modulated with an alternating current component. By way of example only, the direct current component of the voltage across terminals 9 and 10 may be a nominal 15 volts and the alternating current component may have a peak voltage of about 300 volts and may be at a frequency of about 1MHz.

With the output terminals 9 and 10 connected to the power supply rails of a railway track, a locomotive powered by means of sliding conductors in contact with the track will, so long a contact with the track is maintained, proceed along the track at a speed determined by the setting of control potentiometer 7. However, should the locomotive encounter a track section where electrical contact with the track is poor owing to dielectric (e.g. dust, grease, oxide etc) on the track, the alternating current component at terminals 9 and 10 will result in ionization of the air gap across the dielectric thereby ensuring continuity of a direct current path for the supply of drive power to the locomotive.

During the normal running of the locomotive, the alternating current component of the power supply to the locomotive will "see" a capacitive load constituted by the locomotive. Such a load readily passes the alternating current component and imposes no instability whatsoever upon the transistor oscillator operating conditions.

As has been mentioned previously herein, the invention can be embodied in an add-on unit for use with an existing direct current supply. Such an add-on unit might comprise the transistor oscillator 3 and output stage transformer 4 of the arrangment shown in FIG. 1.

FIG. 2 shows an alternative embodiment of the invention which employs solid state components from end to end and achieves rugged solid state reliability, compactness and cost competitiveness by virtue of this. The input step-down transformer of FIG. 1 is replaced in FIG. 2 by a diode bridge rectifier 11, and the following transistor oscillator of FIG. 1 is replaced in FIG. 2 by a free running multivibrator 12 the output of which is gated by a transistor 13 in dependence upon the setting of an adjustable resistance 14. The collector circuit of transistor 13 is inductively coupled, firstly, to a diode bridge rectifier 15 adapted to derive a nominal 15 volt direct current component from the output of transistor 13 and, secondly, to a modulating transformer circuit 16 arranged to modulate the direct current component with an alternating component.

In operation of the arrangement of FIG. 2, the multivibrator 12 produces pulse outputs each of which serve to inject a series of charges into a capacitor 17 connected in the base circuit of gating transistor 13. The charging of capacitor 17 is dependent upon the setting of control variable resistor 14 which thereby determines the gating of the multivibrator output by transistor 13. The inductive coupling shown between transistor 13 and the output stage thus feeds into the output stage series of pulses the duration of each of which is dependent upon the setting of variable resistor 14, the frequency of the pulses corresponding to the multivibrator frequency. The diode bridge rectifier 15 derives from the inductively-coupled input thereto a direct current supply the voltage of which is dependent upon the setting of control resistor 14 (whereby control resistor 14 determines the speed of a locomotive powered from the described circuit), and the circuit 16 provides a modulating alternating current component.

As with the embodiment of FIG. 1, the embodiment of FIG. 2 in operation provides a nominal direct current supply to a locomotive for example as long as electrical contact between the locomotive and the track is maintained. During this period, the alternating current component is effectively connected to the capacitive load constituted by the locomotive. As soon as the locomotive encounters dust, grease, oxide or other dielectric layer on the track and electrical contact with the track is disrupted, the alternating component is loaded by the dielectric layer and serves to ionize the air gap embracing the dielectric layer. By virtue of the air gap ionization, the direct current path, which is disrupted by the dielectric layer, is re-established. Since the process of air gap ionization and re-establishment of the direct current path follows substantially instantaneously the running of the locomotive onto a dirty or otherwise poorly contacting track area, there is no significant discontinuity in the supply of direct current to the locomotive.

As will readily be appreciated, the gating transistor 13 is a high frequency transistor which must have a power rating sufficient to carry the current necessary to power the locomotive. The inductive coupling between the transistor 13 and its output circuits 15 and 16 requires no core material and can simply by constituted by the appropriate number of conductor turns wound for example on a plastics material former. By replacement of the input transformer of the arrangement of FIG. 1 in the arrangement of FIG. 2, a potentially lower cost construction is achieved which furthermore avoids the potential hazard presented by the risk of transformer leakage in the event of insulation failure.

A more sophisticated form of power supply will now be described with reference to FIG. 3. The power supply differs from those previously described in that the controllable current for driving the locomotive is not a simple direct current of variable amplitude but is a square wave of variable mark to space ratio. By varying the mark to space ratio, the speed of the locomotive is controllable, and improved operatings characterized at low speed are provided. Referring now to FIG. 3 in detail, the power supply includes a step down transformer 20 arranged for connection to a domestic alternating current supply, for example a 240 V 50 Hz supply and through a fuse FS. The output of the transformer is fed to a rectifier 21 arranged to provide a nominal 17 V D.C. supply which is fed to an oscillator 22. The oscillator 22 comprises an integrated circuit chip (RS.555) which is connected to ancillary capacitors C1-C3 and diode D 1 to provide a multivibrator which oscillates at a frequency of 100 Hz. The mark to space ratio of the output of the oscillator is variable by means of potentiometer RV connected in series with a resistor R 1. The output of the oscillator is applied to the base of a transistor TR1 so as to gate pulses of the nominal direct current provided by rectifier 21 to an output C which is connected to the track of a model railway installation. Thus by varying the mark to space ratio of the oscillator, the speed of a locomotive on the track can be controlled.

The power supply also includes an oscillator 23 for providing a relatively high voltage and high frequency signal to the track for ionizing any grease or like dielectric which produces a poor electrical contact between the locomotive and the track. The high frequency oscillator includes a transistor TR2, a transformer T2, a resistor R2, a capacitor C5, and a feed back coil 24 connected to the base of transistor TR2, the oscillator being driven by a voltage derived between a supply conductor connected to the transformer 20 and a centre tap to the primary coil of the transformer, the voltage being rectified and smoothed by a diode D4 and a capacitor C4. The output of the oscillator 23, which typically oscillates at a frequency of 50 KHz, is coupled to the output C by means of an output coil 25 of the transformer T2. A capacitor C6 and a diode D3 are arranged as a blocking circuit to prevent the high frequency output of the oscillator 23 being fed back to the multivibrator 22. The output of the oscillator 23 can be shorted out by means of a switch S2.

The supply to the oscillator 23 is fed through a resistor R3 and across a capacitor C5. When there is a good electrical connection between the locomotive and the track, a relatively low output impedance is presented to the oscillator 23 and its output is damped. Thus during normal operation of the locomotive, no high frequency signal is applied to the track. Thus the oscillator 23 draws a minimal current from the transformer 20 and no current is drawn through resistor R3. As a result, the capacitor C7 becomes charged to a voltage equal to the supply voltage which is developed across capacitor C4. However, when the locomotive encounters a patch of grease or like dielectric on the track, a high impedance is presented to the oscillator, and as a result, the capacitor C5 is discharged and a series of high voltage high frequency pulses is delivered to the track by the oscillator 23 to ionize the grease on the track. A current then flows through the resistor R3, and as a result, the voltage of the supply from the transformer 20 to the oscillator 23 is decreased and the amplitude of the oscillations applied to the track is thereafter decreased. When the grease on the track has been ionized, the oscillator is again damped, and the capacitor C7 is recharged.

A neon tube L is connected in parallel with the output of the oscillator 23 to indicate when grease or like dielectric is encountered by the locomotive on the track. When the locomotive encounters a dielectric on the track, the impedance presented by the locomotive and track increases, and the tube is lit.

A switch S1 is provided at the output C to reverse the polarity of the signal applied to the track to permit reversal of the direction of motion of the locomotive.

In addition to promoting smoother and uninterrupted running of the locomotives in the model railway installation, the waveform supplied by the power supply tends to cause a progressive breakdown of the dielectrics constituted by dirt, grease, etc. on the track so that a continuous cleansing of the track is affected which tends to remove any contact-inhibiting dielectrics from the track, and, as a result reduction in arcing between the locomotives' wheels and the track occurs, which is advantageous in reducing interference for example with domestic radio and television receivers operating in the vicinity of the track.

There have thus been described three circuits designed for powering a model railway installation and to avoid the problems hitherto commonly encountered in regard to the maintenance of electrical contact between the locomotive and the power rails on the track. The same, or similar circuits obviously are applicable also to model vehicle roadway installations and the like and the contactor on the vehicle for receiving current from the supply rail need not be the vehicle wheel but can for example comprise a sliding connector in contact with the supply rail. Moreover, the invention could readily be applied to so-called 'dodgem' cars at fairgrounds.

Furthermore, whilst the invention has been described herein in terms of model vehicles powered by a d.c. motor from a combined d.c. and a.c. supply, the a.c. component providing the track cleansing function, the invention is equally appliable to vehicles powered by a.c. motors.

It is furthermore to be understood that while only three embodiments of the invention have been described, many alternatives, alterations and modifications will occur to those skilled in the art. The invention is not to be regarded as being limited to the illustrated embodiments which are exemplary only.

I claim:

1. In a power supply for a model vehicle installation wherein electrically powered model vehicles carrying their own respective drive motors are adapted to travel on a track drawing electrical power from trackside conductors through contactors on the vehicles, the improvement comprising normally suppressed means for supplying to said trackside conductors, in addition to the electrical power supplied to drive said vehicles, an alternating current component of such frequency and amplitude as to be capable of breaking down a contact-inhibiting dielectric layer formed between the vehicle contactors and the trackside conductors, said alternating current supply means becoming operable only in response to the detection of a build-up of the dielectric layer between said contactors and said conductors.

2. A power supply as claimed in claim 1, wherein the electrical power supplied for driving said vehicles comprises a pulsating direct current and further including means for selectively varying the mark-to-space ratio of said pulsating direct current to control the speed of the vehicle powered thereby.

3. A power supply as claimed in claim 1 wherein said alternating current component is arranged to have an initial peak amplitude.

4. In a model railway installation including a railway track, a wayside conductor associated with said track, at least one model railway vehicle having an inboard electric drive motor adapted to be driven by electric power supplied from said wayside conductor to the motor through contactor means on the vehicle engaged with said wayside conductor the invention which comprises a. power supply means for supplying an electric current to the wayside conductor to drive the vehicle, said power supply means including a domestic alternating-current supply voltage, rectifier means for deriving from said supply voltage a rectified D.C. current, and multi-vibrator means for deriving a square wave signal from said rectified D.C. current for application to said conductor to drive said vehicle;
 b. speed control means for selectively controlling said electric current to control the speed of the vehicle along the track, said speed control means including selectively variable time constant means for varying the time constant of said multi-vibrator means to selectively vary the mark-to-space ratio of said square wave, thereby to vary the speed of the vehicle; and
 c. oscillator means for applying to said conductor an alternating signal having an amplitude and frequency capable of breaking down any contact-inhibiting dielectric layer formed between said conductors and the vehicle contactors.

5. A model railway installation in accordance with claim 4 wherein said oscillator means includes a transistor oscillator driven by said rectified current, a resistor, a capacitor arranged to be charged by said current through said resistor, said capacitor having an input connected to said oscillator, whereby upon commencement of operation of said oscillator, said capacitor discharges into said input.

6. An electrical power supply system for model railroads or the like of a type including a direct-current motor-driven vehicle having contact means which engage a stationary conductive surface through which the driving power is supplied, comprising a. means for supplying direct-current control current to said conductive surface for driving the vehicle;
 b. means for varying the level of the direct-current control current to control the operating speed of the vehicle; and
 c. oscillator means for modulating the direct-current control current with an alternating-current signal to supply alternating-current power to the conductive surface for removing by ionization a dielectric layer of impurities thereon.

7. An electrical power supply system for model railroads or the like of a type including a direct-current motor-driven vehicle having contact means which engage a stationary conductive surface through which the driving power is supplied, comprising a. means for supplying pulsating direct-current power having a square-wave waveform to said conductive surface for driving the vehicle;
 means for adjusting the mark-to-space ratio of the direct-current pulses of said current supply means to control the effective level of the current and, consequently, the operating speed of the vehicle; and
 c. oscillator means for modulating the direct current with an alternating-current signal to supply alternating-current power to the conductive surface for removing by ionization a dielectric layer of inpurities thereon.

8. An electrical power supply system for model railroads or the like of a type including a direct-current motor-driven vehicle having contact means which engage a stationary conductive surface through which the driving power is supplied, comprising a. means for supplying direct-current control current to said conductive surface for driving the vehicle;
b. means for varying the level of the control current to control the operating speed of the vehicle; and
c. oscillator means for modulating the control current with an alternating-current signal to supply alternating-current power to the conductive surface for removing by ionization a dielectric layer of impurities thereon, said oscillator means being normally suppressed and being operable to supply the alternating-current power only upon the detection of the layer of inpurities on said conductive surface.

9. Apparatus as defined in claim 8, wherein the operation of said oscillator means is dependent upon the conductivity between the supply surface and the vehicle contact means.

10. Apparatus as defined in claim 8, wherein said oscillator means is operable to provide an alternating-current signal the amplitude of which is non-linearly time dependent with an initial peak condition when the oscillator means is in the non-suppressed condition.

11. An electrical power supply system for model railroads or the like of a type including a direct-current motor-driven vehicle having contact means which engage a stationary conductive surface through which the driving power is supplied, comprising a. means for supplying direct-current control current to said conductive surface for driving the vehicle;

means for varying the level of the direct-current control current to control the operating speed of the vehicle; and oscillator means for modulating the control current with an alternating-current signal having a frequency on the order of at least 500 Hz and a peak voltage of at least 100 volts, thereby to supply alternating-current power to the conductive surface for removing by ionization a dielectric layer of impurities thereon.

12. In a power supply for a model vehicle installation wherein electrically powered model vehicles carrying their own respective drive motors are adapted to travel on a track drawing electrical power from trackside conductors through contactors on the vehicles, the improvement comprising means for supplying to said trackside conductors, in addition to the electrical power supplied to drive said vehicles, an alternating current component having a frequency on the order of at least 500 Hz and a peak voltage of at least 100 volts, thereby to break down any contact-inhibiting dielectric formed between the vehicle contactors and the trackside conductors.

13. A model railway installation, comprising a railway track; wayside conductor means associated with said track; at least one model railway vehicle having an inboard electric drive motor adapted to be driven by electric power supplied from said wayside conductor means to the motor through contactors on the vehicle engaged with said wayside conductor means; a power supply unit coupled to said wayside conductor means, said power supply unit including means for supplying an electric current to the conductor means to drive the vehicle; speed control means for selectively controlling said electric current to control the speed of said vehicle along the track; and oscillator means for applying to said conductor means an alternating signal having a peak amplitude of at least 100 volts and a frequency on the order of at least 500 Hz, thereby to break down any contact-inhibiting dielectric formed between said conductor means and the vehicle contactors.

* * * * *